United States Patent
Suzuki et al.

(10) Patent No.: US 6,870,442 B1
(45) Date of Patent: Mar. 22, 2005

(54) HIGH-FREQUENCY DEVICE (75) Inventors: Kotaro Suzuki, Hyogo (JP); Riho Sasaki, Osaka (JP); Yoshiharu Omori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 46 days.

(21) Appl. No.: 10/465,996

(22) PCT Filed: Sep. 20, 2002

(86) PCT No.: PCT/JP02/09677
§ 371 (c)(1),
(2), (4) Date: Jun. 30, 2003

(87) PCT Pub. No.: WO03/028235
PCT Pub. Date: Apr. 3, 2003

(30) Foreign Application Priority Data

| Sep. 21, 2001 | (JP) | 2001-288661 |
| Sep. 21, 2001 | (JP) | 2001-288662 |
| Sep. 21, 2001 | (JP) | 2001-288663 |

(51) Int. Cl.$^7$ .............................. H03H 9/64; H03H 9/72; H01P 1/10
(52) U.S. Cl. ...................... 333/133; 333/103; 455/83
(58) Field of Search .................... 333/133, 101, 333/103; 455/78, 83

(56) References Cited

U.S. PATENT DOCUMENTS 6,437,662 B1    8/2002  Taniguchi
6,472,953 B1   10/2002  Sakuragawa et al.
6,731,184 B1 *  5/2004  Muto et al. ............. 333/103
6,759,925 B2 *  7/2004  Satoh et al. ............ 333/133

FOREIGN PATENT DOCUMENTS

| JP | 06-14454     | 1/1994  |
| JP | 11-154804    | 6/1999  |
| JP | P2000-323961 A | 11/2000 |
| JP | P2001-44884 A  | 2/2001  |
| JP | P2001-102957 A | 4/2001  |
| JP | P2001-119260 A | 4/2001  |
| JP | P2001-211097   | 8/2001  |
| JP | P2001-292073 A | 10/2001 |

* cited by examiner

Primary Examiner—James H. Cho
(74) Attorney, Agent, or Firm—McDermott Will & Emery LLP (57) ABSTRACT The invention aims to provide a high-frequency device enable to protect circuits connected to an antenna terminal from possible intruding static electricity or high voltage noises. Diplexer 11 connected to antenna terminal 10 carries out demultiplexing or multiplexing frequency for GSM or DCS band. Circuits to process frequency for GSM and DCS band have switches 13 and 14 respectively for switching to transmit or to receive signals for diplexer 11. Switch 13 and 14 are connected to low pass filters 15 and 16 respectively to clear off higher harmonics in transmitting signals, and are connected to SAW filters 17 and 18 having respective specific pass bands. Filters 15, 16, 17 and 18 are connected to terminals 19, 20, 21 and 22 respectively. Moreover, a first end of varistor 23 is connected between antenna terminal 10 and diplexer 11 and a second end of varistor 23 is connected to ground terminal 24.

13 Claims, 7 Drawing Sheets

REFERENCE NUMERALS IN THE DRAWINGS

10 ANTENNA TERMINAL

11 DIPLEXER (DIP)

13, 14 SWITCH (SW)

15, 16 LOW PASS FILTER (LPF)

17, 18, 65 SAW FILTER 19, 20, 21, 22, 23 TERMINAL 24, 33, 38 GROUND TERMINAL 30, 36, 41, 42, 45, 49 INDUCTOR 32, 70, 80 VARISTOR 34, 35, 37, 43, 44, 46, 48, 50 CAPACITOR 40, 47, 64 DIODE

60 MULTILAYER CERAMIC SUBSTRATE

61 MULTIPLAYER COMPOSITE DEVICE 62, 66 CERAMIC LAYER

63 CONDUCTIVE PATTERN

67 INTERNAL ELECTRODE LAYER

US 6,870,442 B1

HIGH-FREQUENCY DEVICE

The application is a National Stage application of International Application No. PCT/JP02/09677 filed Sep. 20, 2002.

TECHNICAL FIELD

The present invention relates to mobile communication equipment such as cellular phones or the like, and more specifically to high-frequency devices enable to use in an antenna duplexer for transmitting and receiving signals.

BACKGROUND ART

Risks owing to undesired static electricity or noises damaging internal electrical circuits are noticed recently in the field of mobile communication equipment such as cellular phones or the like.

Figure 8:
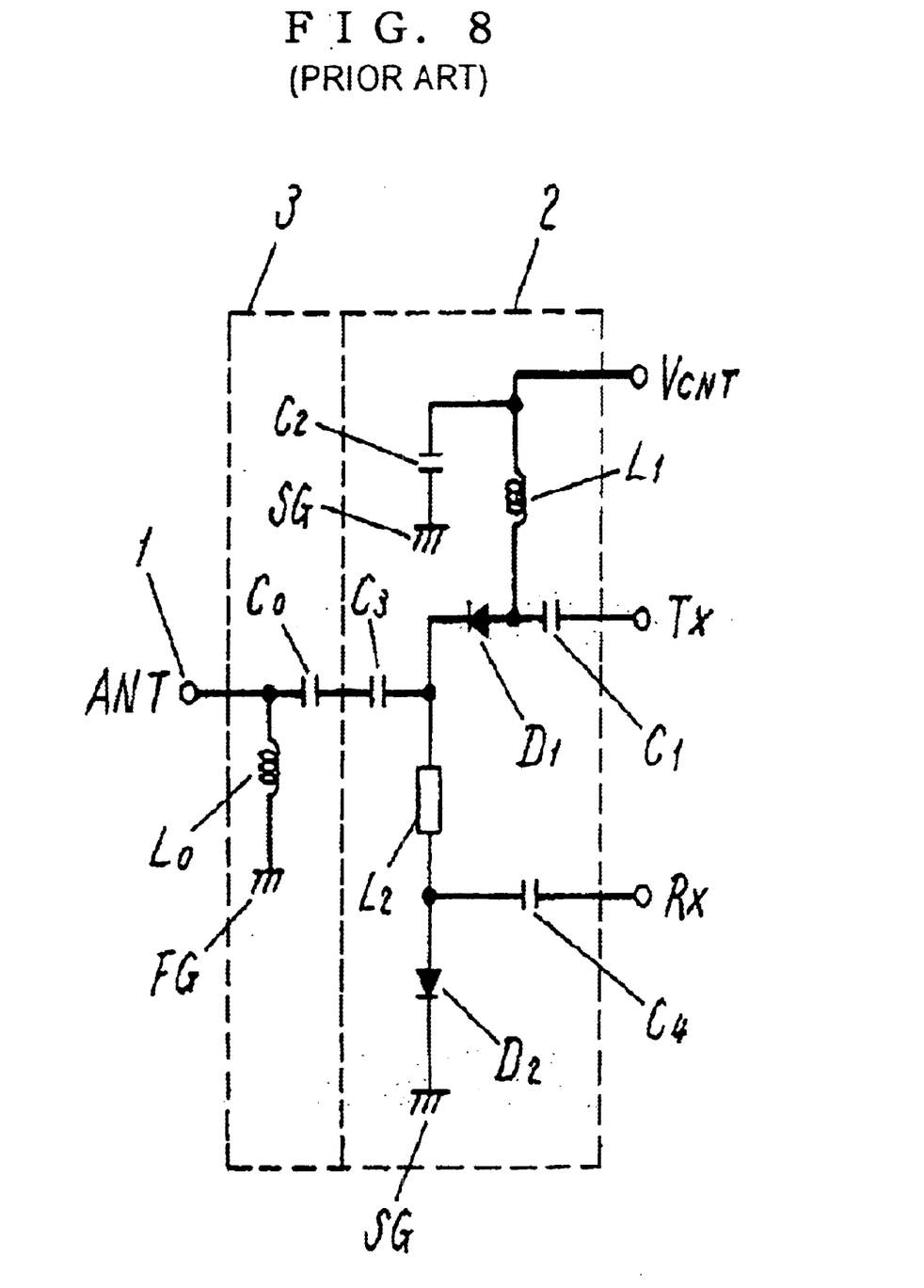
FIG. 8 illustrates a circuit diagram of a conventional high-frequency device.

A measure is disclosed in Japanese Patent Laid-Open Application No. 2001-127663 that has high pass filter 3, consisted of capacitor $C_0$ and inductor $L_0$ connected between antenna terminal 1 and switching circuit 2 to protect switching circuit 2 as shown in FIG. 8.

Mobile communication equipment such as cellular phones or the like are now making a rapid progress for downsizing year by year, which in this context requires downsized devices to house at inside of the equipment.

Above-mentioned high pass filter 3 must be altered to have a multiple stage form of capacitor $C_0$ and inductor $L_0$ to provide high pass filter 3 with a larger out-of-pass band attenuation. However, disadvantages must be agreed to accept not only an increased insertion loss but also a large device in size when a multiple stage form of capacitor $C_0$ and inductor $L_0$ is introduced to provide high pass filter 3 with a large out-of-pass band attenuation.

Additionally, if high voltage noises which have close frequencies to signal pass band and therefore can travel through high pass filter 3 intrude into, for example, mobile communication equipment, the static electricity or the high voltage noises will intrude directly into switching circuit 2 connected to an antenna terminal 1 to cause an incident of destroying the mobile communication equipment.

The present invention aims at providing the high-frequency devices capable of protecting circuit devices connected to post stages of antenna terminal 1 from possible high voltage noises having close frequencies to the signal pass band.

SUMMARY OF THE INVENTION

Aiming at the above-mentioned purposes, the high-frequency device disclosed in this invention has the following configuration comprising:

(a) an antenna terminal;
(b) a diplexer connected to the antenna terminal;
(c) a plurality of switches connected to the diplexer; and
(d) SAW filters and low pass filters connected to the switches, wherein the switches are provided with diodes, and a varistor is connected between the antenna terminal and the diodes.

The configuration can protect the circuit containing the diodes by absorbing undesired static electricity or high voltage noises intruding through the antenna terminal.

DETAILED DESCRIPTIONS OF THE INVENTION (Exemplary Embodiment 1)

Figure 1:
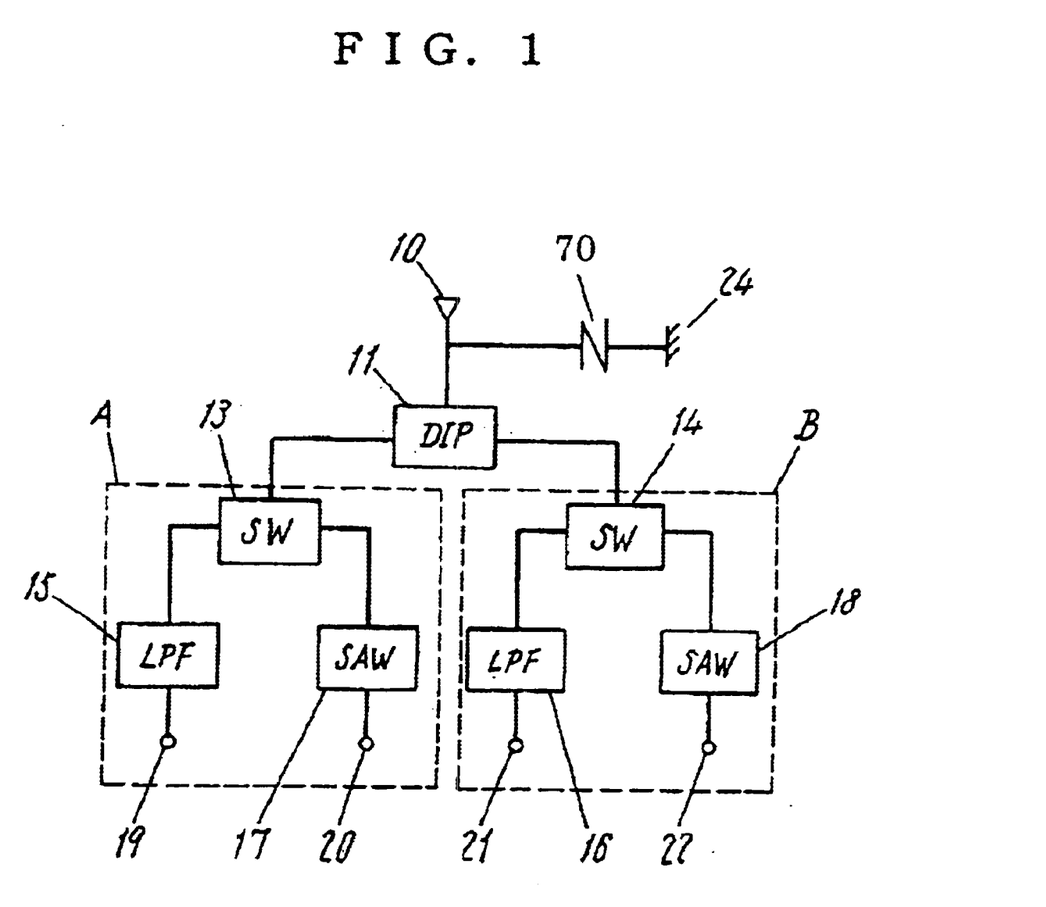
FIG. 1 illustrates a first circuit of a high-frequency device used in the exemplary embodiment of the present invention.

FIG. 1 illustrates a first wiring diagram of a high-frequency device used in the present invention. This kind of circuit can be used, for example, in an antenna duplexer for a dual band cellular phone system complying with GSM/DCS (Global System for Mobile Communication/Digital Cellular System), a European standard for digital telephony.

In FIG. 1, diplexer (hereafter referred to as DIP) 11 connected to antenna terminal 10 works for demultiplexing or multiplexing frequency of GSM band and DCS band.

Circuit section marked A handle frequency of GSM band and circuit section marked B handle frequency of DCS band. In respective circuits A and B, switches (hereafter referred to as SW) 13 and 14 select signals to transmit or to receive for DIP 11.

SWs 13 and 14 are connected to low pass filters (hereafter referred to as LPF) 15 and 16 to clear off higher harmonics in transmitting signals, and connected to SAW filters 17 and 18.

Filters 15, 16, 17 and 18 are connected to terminals 19, 20, 21 and 22 respectively. SW 13 is provided with diodes, not shown in FIG. 1. A first terminal of varistor 70 is connected between antenna terminal 10 and DIP 11. A second terminal of varistor 70 is connected to ground terminal 24.

(Exemplary Embodiment 2)

Figure 2:
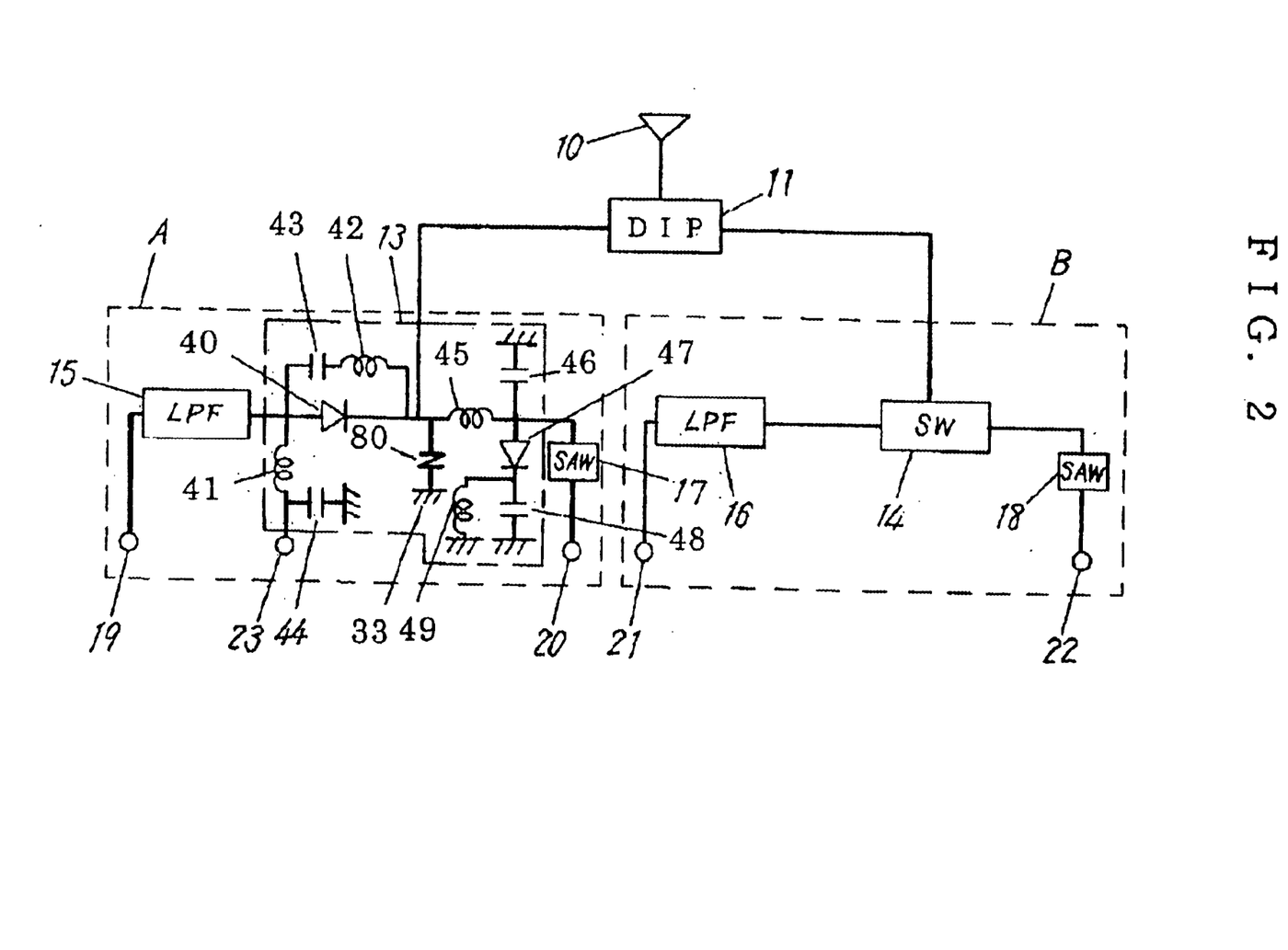
FIG. 2 illustrates a second circuit of a high-frequency device used in the exemplary embodiment of the present invention.

FIG. 2 illustrates a second wiring diagram of a high-frequency device used in the present invention. Different from FIG. 1 showing the circuit in a block diagram, FIG. 2 shows the circuit of switch 13 in a specific diagram.

This kind of circuit can be used, for example, in an antenna duplexer for a dual band cellular phone system complying with GSM/DCS (Global System for Mobile Communication/Digital Cellular System), a European standard for digital telephony.

In FIG. 2, DIP 11 connected to antenna terminal 10 works for demultiplexing or multiplexing frequency of GSM band and DCS band.

Circuit section marked A handle frequency of GSM band and circuit section marked B handle frequency of DCS band. In respective circuits A and B, SW 13 and 14 select signals to transmit or to receive for DIP 11 SWs 13 and 14 are connected to LPFs 15 and 16 to clear off higher harmonics in transmitting signals, and connected to SAW filters 17 and 18 having respective specific pass bands.

Filters 15, 16, 17 and 18 are connected to terminals 19, 20, 21 and 22 respectively.

SW 13 has the following structure comprising:
(a) diode 40 and inductor 41 are connected in series with a connection route between antenna terminal 10 and terminal 23;
(b) a series circuit consisted of inductor 42 and capacitor 43 is connected in parallel with diode 40, and capacitor 44 is connected in parallel between inductor 41 and terminal 23;
(c) inductor 45 is connected in series between antenna terminal 10 and SAW filter 17, and is connected in parallel with the circuit consisted of capacitor 46, diode 47, capacitor 48 and inductor 45;
(d) a first terminal of varistor 80 is connected between diode 40 and inductor 45, in other words varistor 80 is connected between antenna terminal 10 and diode 40, 47 and SAW filter 17; and
(e) a second terminal of varistor 80 is connected to ground terminal 33.

(Exemplary Embodiment 3)

Figure 3:
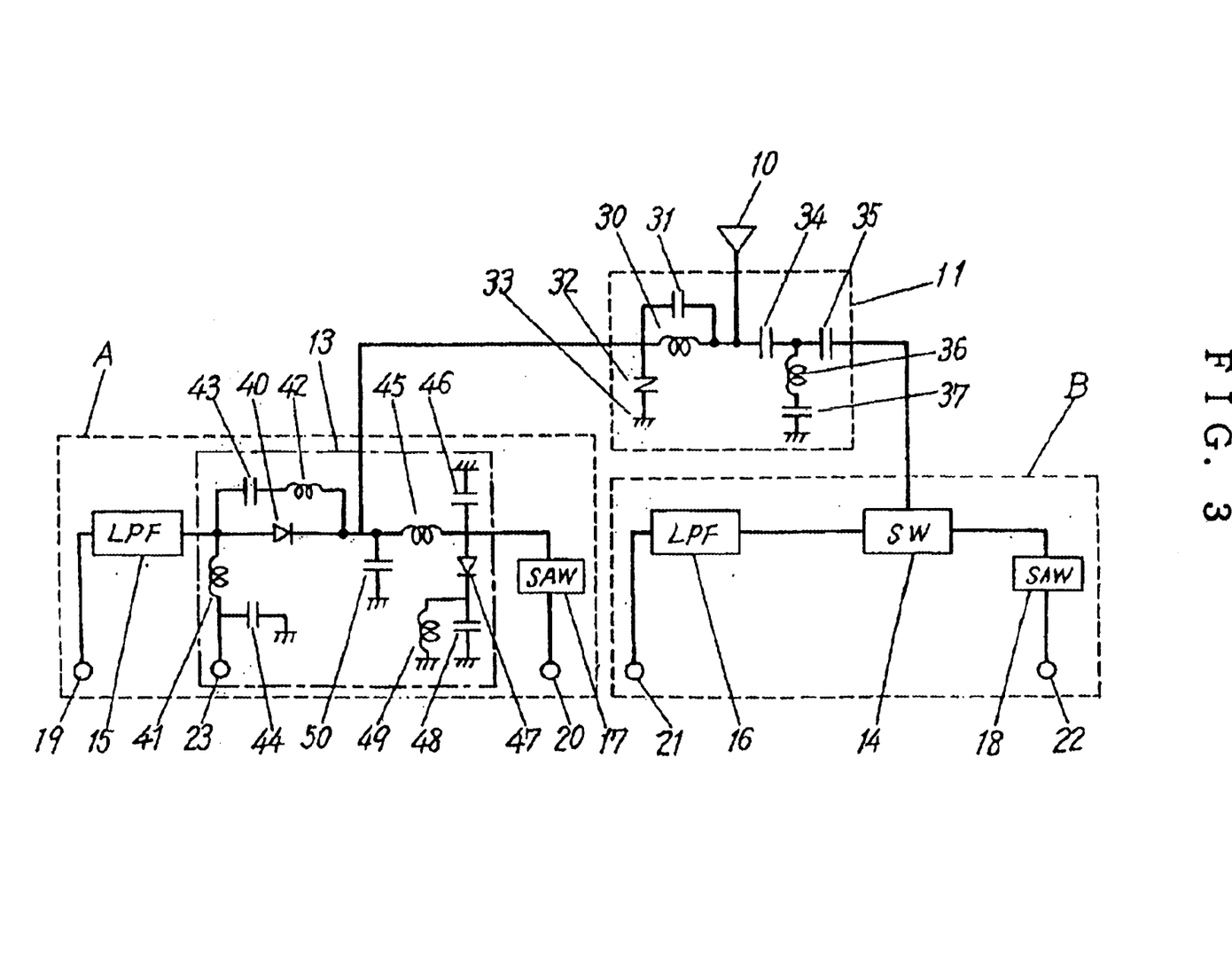
FIG. 3 illustrates a third circuit of a high-frequency device used in the exemplary embodiment of the present invention.

FIG. 3 illustrates a third circuit of a high-frequency device used in the exemplary embodiment of the present invention. Different from FIG. 2, FIG. 3 shows a specific circuit diagram of diplexer (DIP) 11.

This kind of circuit can be used, for example, in an antenna duplexer for a dual band cellular phone system complying with GSM/DCS (Global System for Mobile Communication/Digital Cellular System), a European standard for digital telephony.

In FIG. 3, DIP 11 connected to antenna terminal 10 works for demultiplexing or multiplexing frequency of GSM band and DCS band.

Circuit section marked A in FIG. 3 handle frequency of GSM band, and circuit section marked B handle frequency of DCS band. In respective circuits A and B, SWs 13 and 14 select signals to transmit or to receive for DIP 11

SWs 13 and 14 are connected to LPFs 15 and 16 to clear off harmonic components in transmitting signals, and connected to SAWs filter 17 and 18 having respective specific pass bands.

Filters 15, 16, 17 and 18 are connected to terminals 19, 20, 21 and 22 respectively.

In GSM circuit side, viewed from antenna terminal 10, DIP 11 has inductor 30 connected in series, and capacitor 31 and varistor 32 connected in parallel, between antenna terminal 10 and SW 13.

In DCS circuit side, viewed from antenna terminal 10, DIP 11 has capacitor 34 and 35 connected in series between antenna terminal 10 and SW 14, and has a series circuit consisted of inductor 36 and capacitor 37 connected in parallel between capacitor 34 and 35. Another terminal of varistor 32 is connected to ground terminal 33.

SW 13 has diode 40 and inductor 41 connected in series between antenna terminal 10 and terminal 23, and has a series circuit consisted of inductor 42 and capacitor 43 connected in parallel with diode 40, and has capacitor 44 connected in parallel between inductor 41 and terminal 23. Moreover, inductor 45 is connected in series between antenna terminal 10 and SAW filter 17, and a circuit consisted of capacitor 46, diode 47, capacitor 48 and inductor 49 is connected in parallel with SAW 17. And capacitor 50 is connected between diode 40 and inductor 45.

(Exemplary Embodiment 4)

Figure 4:
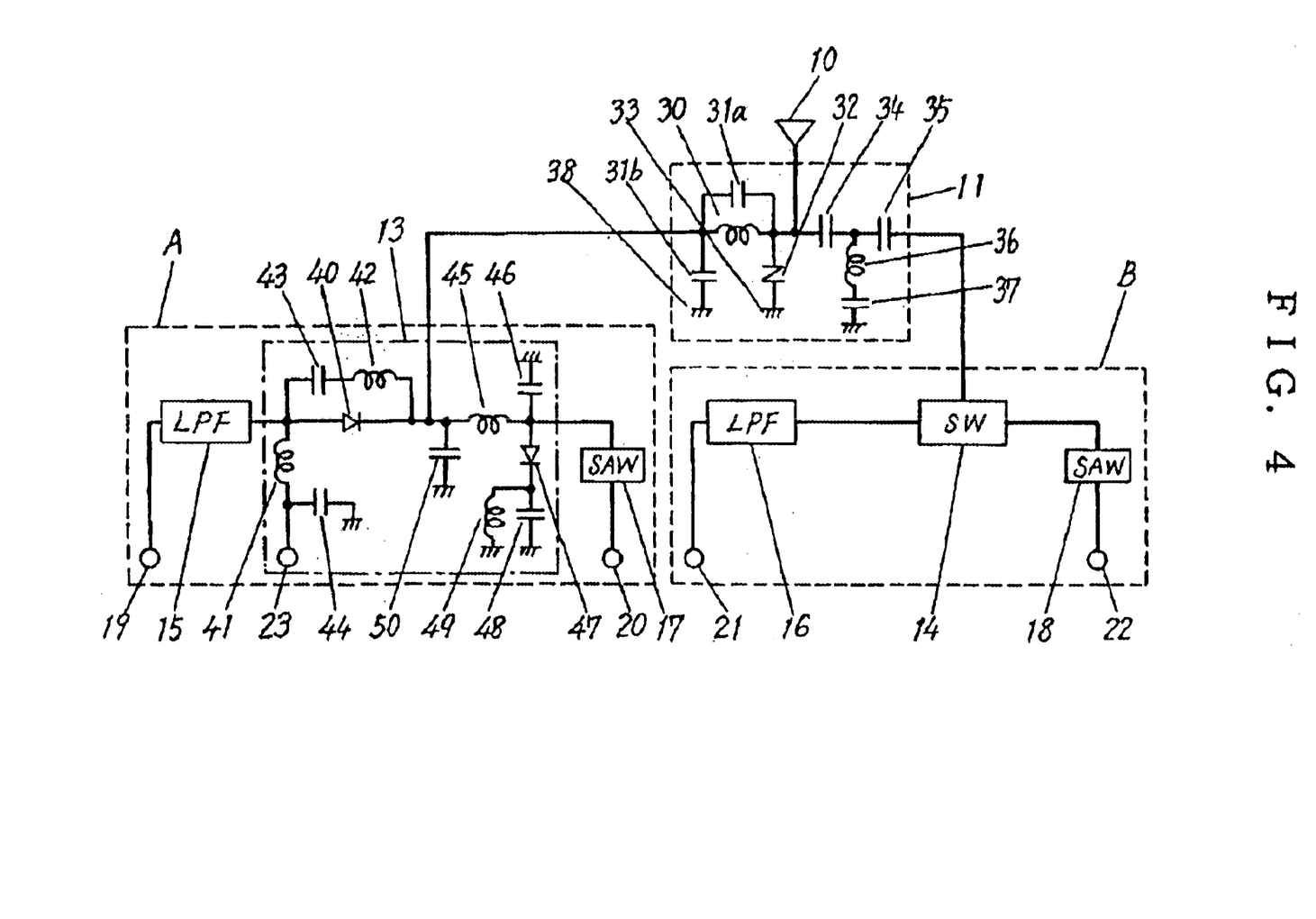
FIG. 4 illustrates a forth circuit of a high-frequency device used in the exemplary embodiment of the present invention.

FIG. 4 illustrates a forth circuit of a high-frequency device used in the exemplary embodiment of the present invention. This kind of circuit can be used, for example, in an antenna duplexer for a dual band cellular phone system complying with GSM/DCS (Global System for Mobile Communication/Digital Cellular System), a European standard for digital telephony.

Showing the circuit approximately similar to exemplary embodiment 3, FIG. 4 differs from FIG. 3 in showing varistor 32 provided in the nearest position to antenna terminal 10.

In FIG. 4, diplexer (DIP) 11 connected to antenna terminal 10 works for demultiplexing or multiplexing frequency of GSM band and DCS band.

Circuit section marked A in FIG. 4 handle frequency of GSM band, and circuit section marked B handle frequency of DCS band. In respective circuits A and B, SWs 13 and 14 play the role of switching to transmit or to receive signals to DIP 11. And SWs 13 and 14 have low pass filters (LPF) 15 and 16 connected to clear off harmonic components in transmitting signals, and are connected to SAW filters 17 and 18 having respective specific pass bands.

Filters 15, 16, 17 and 18 are connected to terminals 19, 20, 21 and 22 respectively.

In GSM circuit side, viewed from antenna terminal 10, DIP 11<has inductor 30 connected in series, and has capacitors 31a and 31b and varistor 32 connected in parallel, between antenna terminal 10 and SW 13.

In DCS circuit side, viewed from antenna terminal 10, DIP 11 has capacitor 34 and 35 connected in series between antenna terminal 10 and SW 14, and has a series circuit consisted of inductor 36 and capacitor 37 connected in parallel between capacitor 34 and 35. End of varistor 32 and end of capacitor 31b are connected to ground terminals 33 and 38.

SW 13 has the configuration similar to FIG. 3 and the description thereof is omitted.

Moreover, DIP 11 has varistor 32 and capacitor 31b, whose other ends are connected to ground terminals 33 and 38, in the section for transmitting or receiving signals to GSM side as shown in the circuit of FIG. 4. In such a circuit configuration having a plurality elements of varistor 32 or capacitor 31b, whose other ends are connected to ground terminals 33 or 38, in the section for transmitting and receiving signals to GSM side, varistor 32 should be provided in the nearer position to antenna terminal 10 to clear off the high voltage noses more quickly.

Varistor 32, shown in FIG. 4, works as a capacitor in a normal operation. A high-frequency device with a small insertion loss can be designed when the electrostatic capacitance is taken into consideration.

Additionally, though an application for GSM/DCS dual band system is described as an example, the scope of the invention is not restricted within the example. But a varistor applied in parallel with antenna terminal and a circuit connected to the antenna terminal can affect similarly, for example, in a single band system or even a triple band system, so long as a measure is required for high voltage noises intruding through an antenna terminal.

(Exemplary Embodiment 5)

Figure 5:
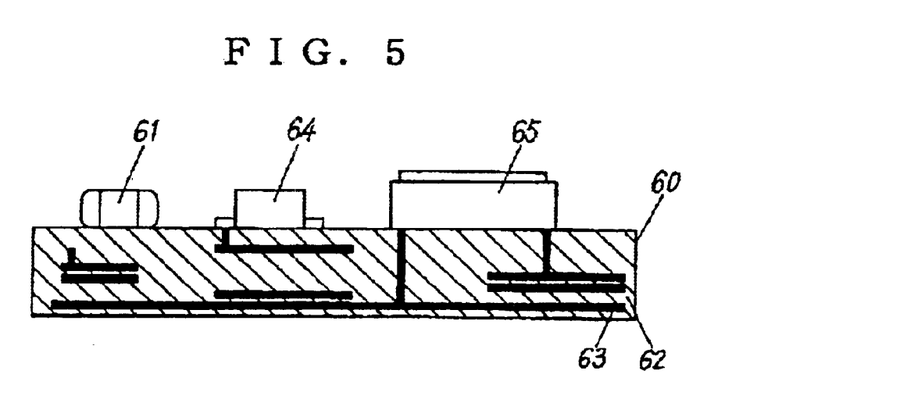
FIG. 5 illustrates a cross-sectional view of a high-frequency device used in the exemplary embodiment of the present invention.

FIG. 5 illustrates a cross-sectional view of a high-frequency device used in the exemplary embodiment of the present invention.

Now, a high-frequency device disclosed in this invention is described with reference to FIGS. 3, 4 and 5.

Firstly in FIG. 5, multilayer ceramic substrate 60 has a structure of ceramic layers 62 and conductive patterns 63 multilayered alternately. The configuration provides antenna terminal 10, SWs 13 (except diode 64) and 14, and LPFs 15 and 16 formed internally or on external surfaces (not shown).

DIP 11 is formed at the inside of multilayer ceramic substrate 60 except sections of varistor 32 and inductor 36. Diode 64, SAW filter 65 and multiplayer composite device 61 consisted of varistor 32 and inductor 36 are formed on the outer surface of multilayer ceramic substrate 60 to practice the circuit shown in FIG. 4.

Multilayer composite device 61 has ceramic layers 66 and internal electrode layers 67 multilayered alternately having external terminals applied on both end surfaces. Varistor 32, composed of ceramic layer having comparatively small relative dielectric constant of not more than 30, is formed from varistor materials composed of specifically zinc oxide as a main constituent and a silicon compound added as an accessory constituent.

Internal electrode layer 67 is formed from a metal such as silver or silver rich compound having a low conductive factor.

The configuration adopted can provide varistor 32 with a very high quality having not only an electrostatic capacitance suppressed in low values of not more than 3 pF but also a variation factor in electrostatic capacitance limited within +/−0.1% under temperature range from −10 to 75 degree C.

Varistor 32, acts as a capacitor in normal operation, fulfills its original function to clear static electricity or high voltage noises off at a time when the static electricity or the high voltage noises intrude through antenna terminal 10.

In other words, upon intrusion of the static electricity or the high voltage noises through antenna terminal 10, firstly varistor 32 clears the high voltage noises off from the device to send original regular signals to SW 13.

The high-frequency device, therefore, can have an excellent reliability because diodes 40, 47 and SAW filter 17 assessed to deteriorate easily in characteristics by undesired static electricity or high voltage noises are protected reliably from the undesired static electricity or the high voltage noises.

In this case, a varistor connected between antenna terminal 10 and DIP 11 may act as a measure for the static electricity or the high voltage noises. However, much difficulty occurs for varistor 32 in matching with other circuits composing the high-frequency device when varistor 32 has a large value of electrostatic capacitance or has a large variation factor in electrostatic capacitance under temperature variation. The high-frequency device deteriorates in characteristics due to a large insertion loss caused by a poor matching condition.

In the configuration of this exemplary embodiment 5, however, the device is consequently designed taking the electrostatic capacitance of varistor 32 into account resulting a good matching condition to other circuits because varistor 32 is allowed to act also as a capacitor.

The configuration can provide the high-frequency device with little insertion loss, as a matter of course, being the static electricity and the high voltage noises are cleared off.

Moreover, multilayer ceramic substrate 60 can be formed with a reduced number of components which contributes to reduce in size of the device, because varistor 32, that works also as a capacitor, and inductor 36 are built into a single multilayered component.

Additionally, in the high-frequency device disclosed in the exemplary embodiment 5, varistor 32 is provided on GSM circuit side only that has pass band frequency of approximately 900 MHz and not provided on DCS circuit side that has pass band frequency of approximately 1.8 GHz. The reason depends upon circuit configuration of diplexer (DIP) 11. Namely, a high pass filter consisted of inductor 36 and capacitor 34 is provided at the nearest position to antenna terminal 10 in the DCS circuit side. This configuration means that the high voltage noises of a low frequency of the order of regular frequency of approximate 500 MHz can not intrude the circuit.

In a case when a high pass filter is not provided in the nearest position to antenna terminal 10, a varistor should preferably be connected in parallel, taking the electrostatic capacitance into account like for GSM circuit side.

Additionally, SAW filter 65 contains SAW filter 17 and 18 housed into a single package.

(Exemplary Embodiment 6)

Figure 6:
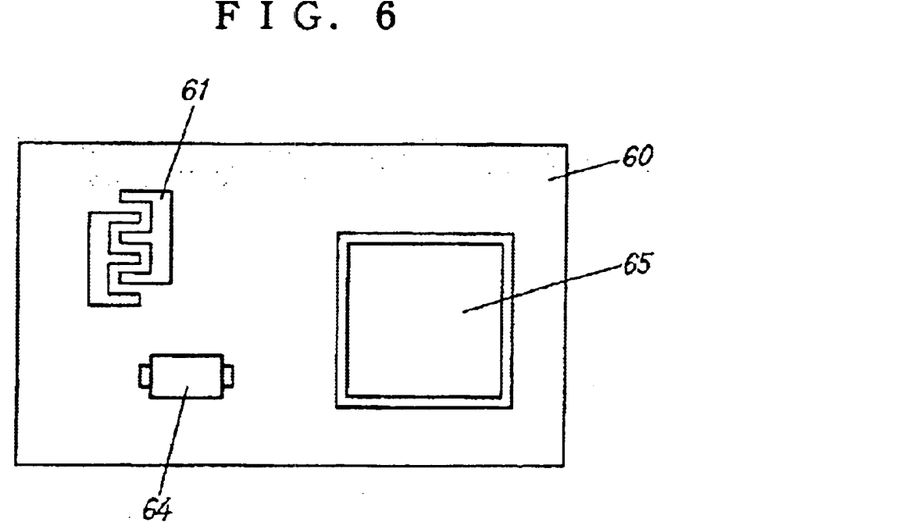
FIG. 6 illustrates a plan view of a high-frequency device used in the exemplary embodiment of the present invention.

FIG. 6 illustrates a plan view of a high-frequency device disclosed in the present invention. Especially, varistor 32 has a newly designed structure. Namely, multilayer ceramic substrate 60 is heat-treated to form varistor 32 after terminals are printed further on varistor 32 which has been printed on the surface of multilayer ceramic substrate 60 with varistor materials described in exemplary embodiment 5.

The configuration, different from the multilayered component described in exemplary embodiment 5, can make a high-frequency device with a low profile and can contribute to downsizing of mobile communication equipment.

(Exemplary Embodiment 7)

Figure 7:
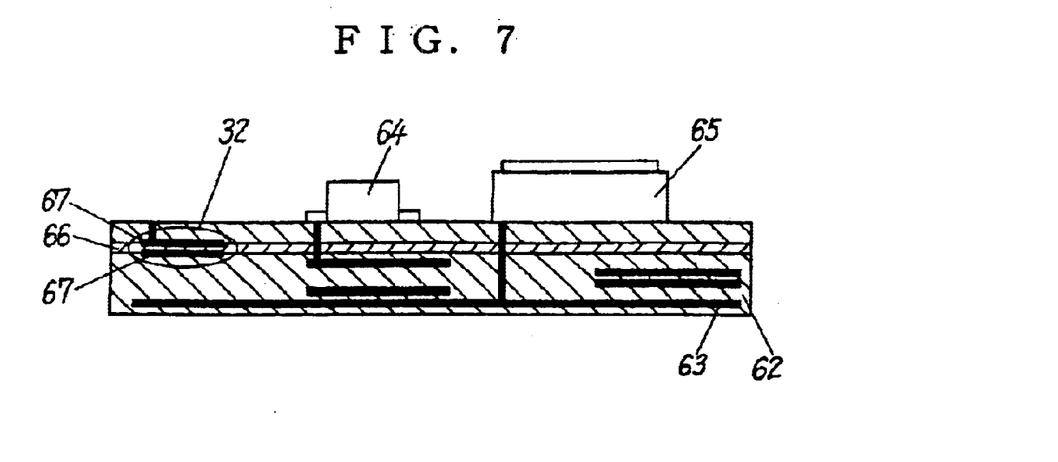
FIG. 7 illustrates a cross-sectional view of another high-frequency device used in the exemplary embodiment of the present invention.

FIG. 7 illustrates a cross-sectional view of another high-frequency device disclosed in the present invention. The high-frequency device is characterized by the structure of varistor 32. Namely, multilayer ceramic substrate 60 has a structure of ceramic layer 62 and conductive pattern 63 multilayered together and has antenna terminal 10, DIP 11, SWs 13 and 14, and LPFs 15 and 16 applied internally or on external surfaces of the board. At the same time, ceramic layer 66 formed from varistor materials and internal electrode layer 67 are multilayered to form varistor 32 at the inside of multilayer ceramic substrate 60 as shown in FIG. 7.

When compared with the high-frequency device described in exemplary embodiment 5 and FIG. 5, the configuration can produce a high-frequency device with a low profile and can contribute to downsizing of mobile communication equipment. Additionally, the configuration has an excellent productivity because varistor is not necessary at the trouble of forming after the formation of multilayer ceramic substrate 60.

INDUSTRIAL APPLICABILITY

As described above, the invention disclosed can provide a high-frequency device enable to protect reliably the high-frequency device itself and other circuit devices in post stages from possible high voltage noises having frequencies close to a pass band frequency intruding through an antenna terminal.

Moreover, the high-frequency device can have an insertion loss suppressed in low values, allowing a varistor to act as a capacitor in normal operations.

Namely, the high-frequency device disclosed in this invention can protect circuits connected to the device, as the varistor absorbs the high voltage noises intruding through an antenna terminal, wherein the varistor is connected in a connection route between the antenna terminal and diodes, both are the configuration components of this invention.

In accordance with an aspect of this invention, the high-frequency device can protect the circuits more reliably, as the varistor is connected to a connection route between the antenna terminal and a diplexer, both are the configuration components of this invention.

In accordance with also an aspect of this invention, the high-frequency device can protect the circuits containing the diodes, as the varistor provided in the diplexer of the high-frequency device absorb undesired static electricity or the high voltage noises intruding through the antenna terminal.

In accordance with also an aspect of this invention, the high-frequency device can be produced with a low profile and can show prescribed electrical characteristics, as the high-frequency device has a structure of multilayer composite device mounted on a substrate, wherein ceramic layers and conductive layers are multilayered alternately to form the multilayer composite device consisted of an inductor provided in a diplexer and a varistor.

In accordance with another aspect of this invention, the high-frequency device can clear off static electricity or high voltage noises more reliably, as the diplexer has a varistor and a capacitor connected to ground terminals, and the varistor is connected in a nearer position to the antenna terminal between the antenna terminal and the diode.

In accordance with an aspect of this invention, the high-frequency device can protect circuit devices connected to the antenna terminal, as the varistor is mounted on a surface of the multilayer ceramic substrate having many functions, and is able to absorb static electricity or high voltage noises intruding through the antenna terminal by the single element itself only.

In accordance with also an aspect of this invention, the high-frequency device can be produced with a low profile and can contribute to downsizing of mobile communication equipment, as the varistor element is formed in-print on a surface of the multilayer ceramic substrate having many functions.

In accordance with also an aspect of this invention, the high-frequency device can show stable characteristics with a low variation factor in electrostatic capacitance and an insertion loss suppressed in low values, as a varistor used has a variation factor in electrostatic capacitance within +/−0.1% under temperature range from −10 to 75 degree C.

In accordance with also an aspect of this invention, deterioration in characteristics of the high-frequency device due to electrostatic capacitance can be suppressed in low values, as a varistor material having relative dielectric constant of not more than 30 is employed, enabling to provide the varistor with electrostatic capacitance of not more than 3 pF.

And, in accordance with another aspect of this invention, the high-frequency device can be produced with a low profile, as the varistor used is formed from zinc oxide as a main constituent and a silicon compound added as an accessory constituent, enabling to provide the varistor with electrostatic capacitance of not more than 3 pF.

And, in accordance with another aspect of this invention, the high-frequency device can have an insertion loss suppressed in low values, as Ag having a low conductive factor is used as a main constituent to form the varistor, wherein the high-frequency device has the structure of ceramic layers composed of zinc oxide as a main constituent and internal electrode layer, or a varistor composed of Ag as a main constituent, multilayered alternately.

What is claimed is:

1. A high-frequency device comprising:
   (a) an antenna terminal;
   (b) a diplexer connected to the antenna terminal;
   (c) a plurality of switches connected to the diplexer; and
   (d) SAW filters and low pass filters connected to the switches, wherein the switches are provided with diodes, and a varistor is connected to a connection route between the antenna terminal and the diode.

2. The high-frequency device of claim 1, wherein the varistor is connected between the diplexer and the antenna terminal.

3. The high-frequency device of claim 1, wherein the switches are provided with the varistor in addition to the diodes.

4. The high-frequency device of claim 1, wherein the diplexer is provided with the varistor.

5. The high-frequency device of claim 1, wherein ceramic layers and conductive layers are multilayered alternately to form a multilayer composite device, consisted of an inductor provided in a diplexer and a varistor, which is mounted on a substrate.

6. The high-frequency device of claim 1, wherein the diplexer has a varistor and a capacitor connected to ground terminals, and the varistor is connected in parallel with the diode in a nearer position to the antenna terminal between the antenna terminal and the diode.

7. The high-frequency device of claim 1, wherein a varistor is mounted on a surface of a multilayer ceramic substrate consisted of conductive patterns and ceramic layers multilayered together to form a structure having a diplexer, switches and a low pass filter.

8. The high-frequency device of claim 1, wherein a varistor is formed in print on a surface of a multilayer ceramic substrate consisted of conductive patterns and ceramic layers multilayered together to form a structure having a diplexer, switches and a low pass filter.

9. The high-frequency device of claim 1, wherein a diplexer, switches a low pass filter and a varistor are formed in a multilayer ceramic substrate consisted of conductive patterns and ceramic layers multilayered together.

10. The high-frequency device of claim 1, wherein the varistor has a variation factor in electrostatic capacitance within +/−0.1% under temperature range from −10 to 75 degree C.

11. The high-frequency device of claim 1, wherein the varistor is formed from a material having relative dielectric constant of not more than 30.

12. The high-frequency device of claim 1, wherein the varistor is formed from zinc oxide as a main constituent and a silicon compound added as an accessory constituent.

13. The high-frequency device of claim 1, wherein the varistor is formed from ceramic layers composed of zinc oxide as a main constituent and internal electrode layers composed of Ag as a main constituent alternately multilayered together.

* * * * *